Sept. 10, 1968          R. C. DAVIS          3,400,542
UNDER GROUND CABLE LAYING VEHICLE WITH FORCE FEED DEVICE
Filed Oct. 24, 1965          2 Sheets-Sheet 1
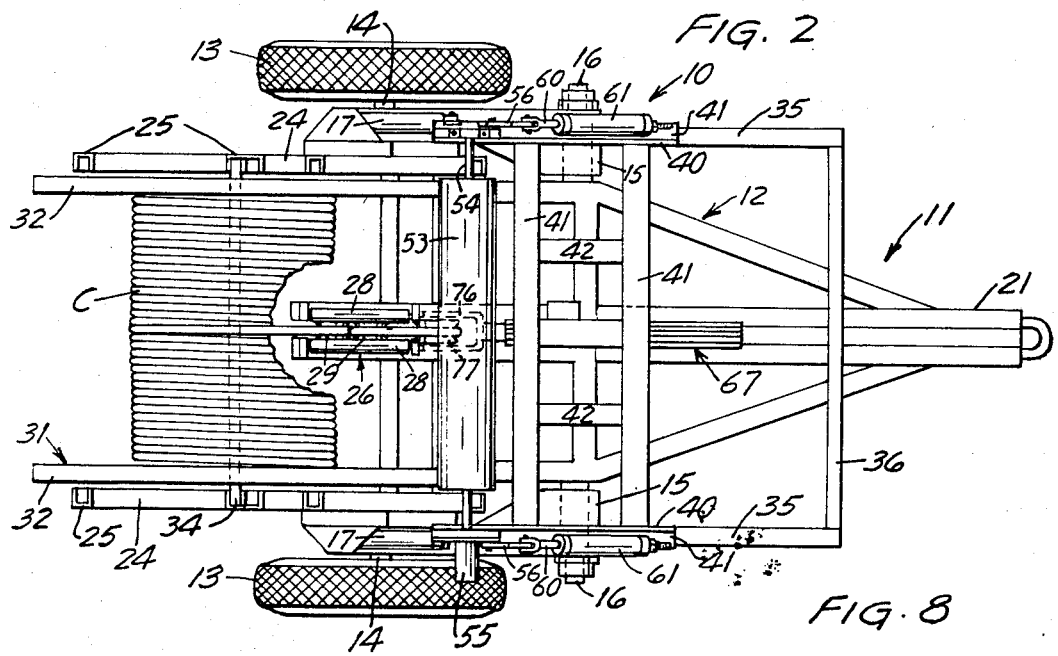
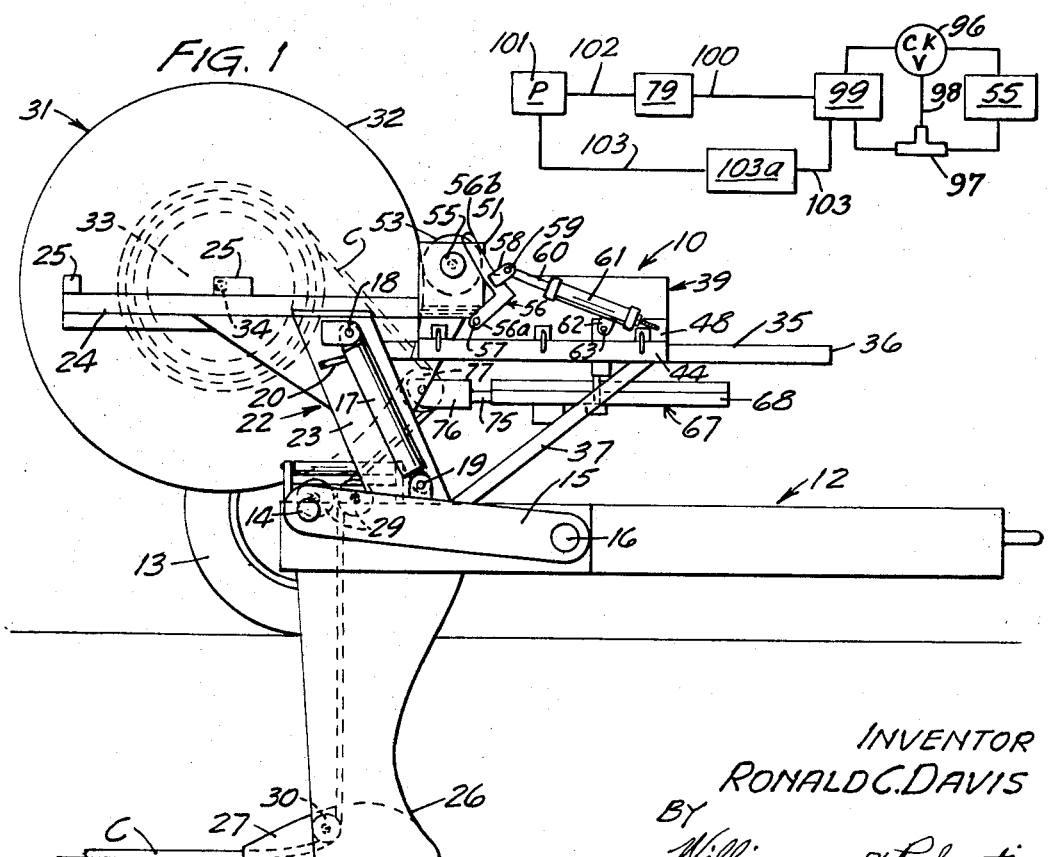
INVENTOR
RONALD C. DAVIS
BY
Williamson & Palmatier
ATTORNEYS

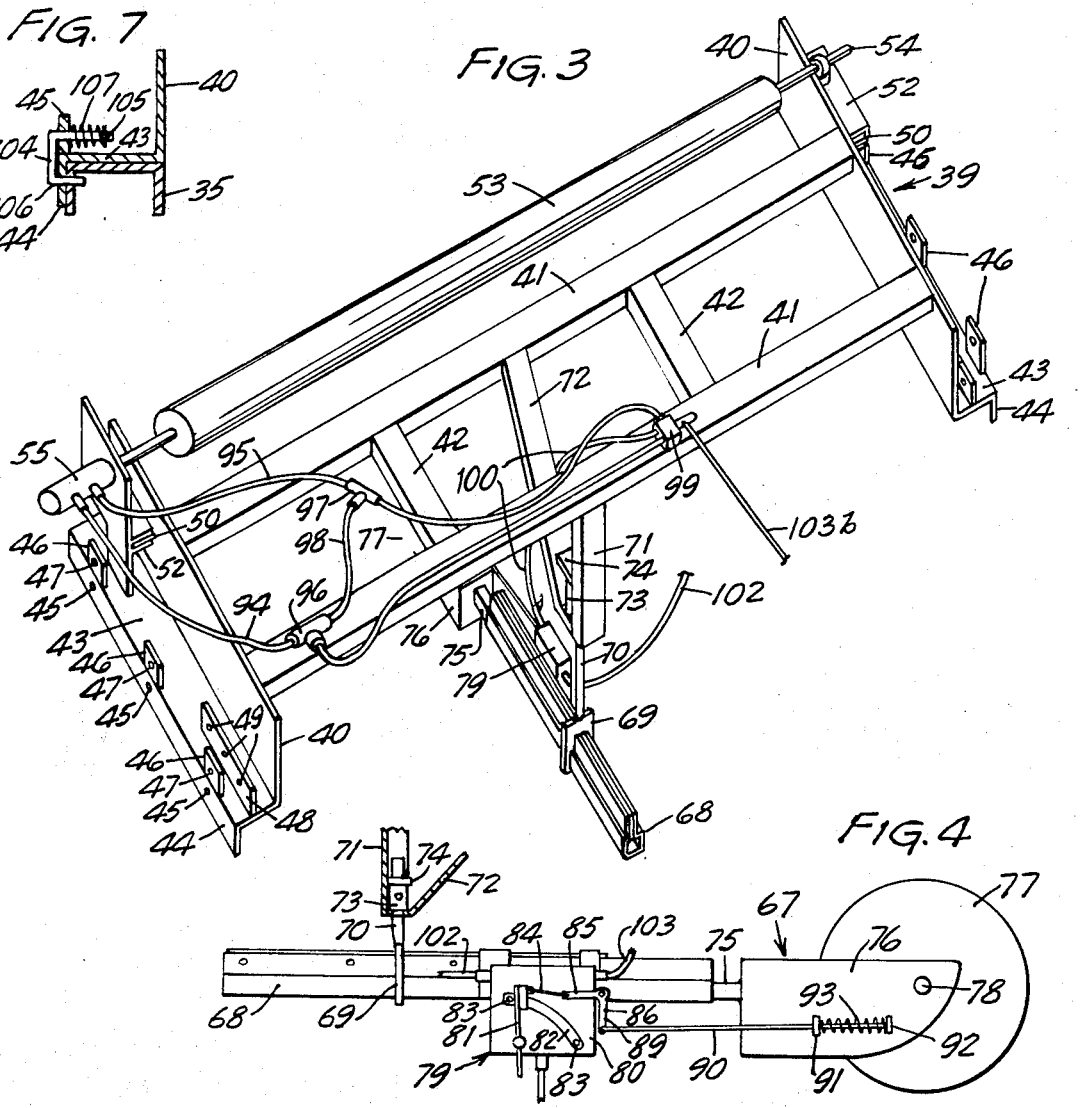

United States Patent Office 3,400,542
Patented Sept. 10, 1968

3,400,542
UNDER GROUND CABLE LAYING VEHICLE
WITH FORCE FEED DEVICE
Ronald C. Davis, Minneapolis, Minn., assignor to
August R. Scheppmann, Okabena, Minn.
Filed Oct. 24, 1965, Ser. No. 504,662
6 Claims. (Cl. 61—72.6)

ABSTRACT OF THE DISCLOSURE

A force feed device for a cable laying vehicle which lays cable below the surface of the ground. A tension sensing mechanism sensing tension on the cable during the cable laying operation and controlling a drive to the cable laying reel to minimize damage to the cable.

Summary of the invention

A cable laying vehicle including the chassis having ground engaging wheel and a sub-surface plow and revolvably supporting a cable reel thereon. A revolvable drive member engaging the frame of the reel and being revolvably driven by a hydraulic motor. A tension sensing pulley mechanism sensing the tension on the cable and controlling a fluid pressure system for ultimately controlling the hydraulic motor and drive to the reel.

This invention relates to cable laying apparatus and more specifically to a force feed device for cable laying apparatus.

In most conventional cable laying apparatus, the cable is unwound from a reel mounted on a vehicle and it is placed within a trench as the vehicle is moved in a forwardly direction. The unwinding action of the cable from the reel is attributable to the oppositely directed forces produced by the forwardly moving vehicle and the weight of the cable laying within the trench so that the cable is normally unwound only when the vehicle is moved. Thus, in many of the conventional cable laying apparatus the cable is subjected to a number of pulling or jerking actions which often damages the small conductors thereof. Another problem associated with conventional cable laying apparatus is that of having the cable removed from the trench during the cable laying operation due to irregularities in the terrain. For example, when the particular course the cable is to be laid involves traversing a depressed area such as a valley, the tension exerted on the cable quite often times lifts the same from the trench in which it was disposed. This type of occurrence necessitates repositioning the cable within the trench and this involves a relatively time consuming operation.

It is therefore, a general object of this invention to provide conventional cable laying apparatus with a force feed device, of simple and inexpensive construction, and which is operable to drive the cable reel so that the cable is unwound therefrom during the cable laying operation and is not subjected to any tension to thereby minimize the danger of damage to the cable and to preclude accidental removal of the cable from the trench.

Another object of this invention is to provide a force feed device which may be readily mounted on any conventional cable laying vehicles, including both towed and self-propelled types, the device including a revolvable drive member which is engageable with the end flanges of the cable reel or drum for revolving the latter to unwind the cable therefrom during the cable laying operation.

A more specific object of this invention is to provide a cable laying apparatus with a force feed device including drive means for revolving the cable drum, and also including a control mechanism engageable with the cable and being operable in response to tension exerted thereon by the cable as the latter is unwound to operate said drive means, and being operable in the absence of tension exerted thereon by the cable to render the drive ineffective.

These and other objects and advantages of the invention will more fully appear from the following description made in connection with the accompanying drawings, wherein like character references refer to the same or similar parts throughout the several views, and in which:

FIG. 1 is a side elevational view of the cable laying vehicle with a novel force feed device mounted thereon,
FIG. 2 is a top plan view thereof,
FIG. 3 is a perspective view of the force feed device,
FIG. 4 is a side elevational view of the force feed device,
FIG. 5 is a top plan view of the tension sensing and control mechanism,
FIG. 6 is a side elevational view of the tension sensing and control mechanism,
FIG. 7 is a cross sectional view taken approximately along line 7—7 of FIG. 3 and looking in the direction of the arrows, and
FIG. 8 is a flow diagram of the hydraulic drive system.

Referring now to the drawings and more specifically to FIGS. 1 and 2 it will be seen that one embodiment of the novel force feed device, designated generally by reference numeral 10 is shown mounted in cooperating relation on a mobile cable laying vehicle. In the embodiment shown, it will be seen that the vehicle comprises a towed type trailer 11 including a chassis or frame 12 which is mounted for travel over the surface of the ground by means ground engaging tire-mounted wheels 13. The ground engaging wheels 13 are adjustably mounted on the chassis 12 to permit vertical adjustment of the chassis whereby the depth of the trenching implement carried thereby may be varied.

To this end it will be noted that the stub axle 14 of each ground engaging wheel is journaled in the rear end of a forwardly projecting elongate suspension arm 15, the front end of which is revolvably mounted on an outwardly projecting shaft 16 carried by the chassis 12. Means are provided for selectively shifting the suspension arms 15 about their respective shafts 16 to vertically adjust the chassis and to this end it will be seen that a pair of hydraulic piston and cylinder units are provided. It will be noted that each cylinder 17 is pivotally mounted by means of a pivot 18 from the chassis 12 and that the piston rod 19 associated therewith has its end secured to one of the suspension arms 15. Thus when it is desirable to vary the depth of the trenching implement, the piston may be selectively extended or retracted in a manner well known in the art. It is further pointed out that the cylinders 17 of each unit are connected by suitable conduits 20 to a source of hydraulic fluid under pressure.

To this end, it will be seen that the chassis 12 is provided with an elongate draw bar 21 having suitable coupling means for connection to the hitch associated with conventional prime movers such as a tractor or the like. A source of hydraulic fluid may be provided on the trailer 11 or alternatively the conduits may be connected to the hydraulic system associated with conventional tractors.

The chassis 12 is also provided with a mounting structure 22 for mounting the cable drum or reel thereon in a suitable position for unwinding the cable during the cable laying operation. The mounting structure 22 includes a pair of vertically disposed support members 24 that are rigidly secured at their respective lower ends to the sides of the chassis 12 and which project upwardly therefrom. It will be noted that each of the cylinders 17 are actually connected by its associated pivot 18 to the upper end portion of one of the vertical support members 23.

Each of the vertical support members 23 has an elongate longitudinally extending substantially horizontal disposed support member 24 rigidly secured to the upper end thereof and it will be noted that these horizontal support members 24 are disposed in substantially parallel relation with respect to each other. Each of the horizontal support members 24 has a plurality of longitudinally spaced apart bearing members 25 mounted thereon which are of generally U-shaped configuration and each of which is laterally aligned with one of the bearing members on the opposite horizontal support member. Each pair of laterally aligned bearing members 25 is adapted to receive the axle of the cable reel therein thus permitting the cable reel to be mounted in a plurality of longitudinal positions with respect to the mounting structure 22.

In the embodiment shown, a conventional trench forming implement or plow 26 is illustrated mounted on the chassis 12 for forming the trench during the cable laying operation. It will be seen that the trench forming plow 26 is rigidly but detachably secured to the chassis 12 and projects downwardly therefrom. This plow functions similarly to the conventional subsurface agricultural plow and the depth of the trench formed thereby may be readily varied by adjusting the position of the ground engaging wheels 13 with respect to the chassis 12.

The plow 26 has a pair of laterally spaced apart vertically disposed plates or shoe elements 27 secured thereto and extending rearwardly therefrom as best seen in FIGS. 1 and 2. A pair of guide rollers 28, which are disposed in spaced apart relation and are revolvable about axes extending longitudinally of the direction of travel, are mounted adjacent the upper end of the shoe elements 27 and are disposed slightly above and in substantially right angular relationship with respect to a second pair of guide rollers 29 that are longitudinally spaced apart and are revolvable about transverse axes with respect to the direction of travel. These guide rollers 28 and 29 guide the cable downwardly from the cable reel during the cable laying operation. A guide roller 30 extends between and is connected to the shoe elements 27 adjacent the lower end thereof and guides the cable into the trench formed by the plow 26. To this end it will be noted that the roller 30 is positioned rearwardly of but at substantially the same level as the implement or plow 26.

It is pointed out that cable laying apparatus other than the towed type trailer as illustrated herein may also be used in conjunction with my force feed device and that other types of subsurface implements may also be used.

Referring again to FIGS. 1 and 2 it will be seen that a conventional cable reel 31 is shown having a cable C wound thereon, the reel being provided with end flanges 32. The cable reel 32 is also provided with a hub 33 through which projects the axle 34 thereof. As pointed out above, the ends of the axle 34 are adapted to be mounted in one of a pair of the laterally aligned bearing members 25 to revolvably mount the reel for unwinding the cable therefrom. It will be noted that the reel is positioned above the implement or plow 26 so that the cable may be fed substantially vertically downwardly. The two sets of guide rollers 28 and 29 associated with the implement or plow 26 facilitate unwinding and guiding of the cable even though the latter is unwound helically from the reel 31.

Means are also provided for mounting the force feed device 10 in close proximity to the cable reel 21 and to this end it will be seen that a pair of longitudinally extending support elements 35 are provided each being rigidly secured to one of the vertical support members 23 and projecting forwardly therefrom. It will be noted that these longitudinal support elements 35 are disposed in substantially parallel relationship and are interconnected at their forward ends by transverse support element 36 as best seen in FIG. 2. A pair of oblique or inclined brace elements 37 extend between and are rigidly connected with one of the vertical support members 23 and the longitudinal support element 35 associated therewith. It will be noted that the longitudinal support elements 35 which are of substantially channel-shaped configuration are provided with a plurality of apertures in the respective flanges thereof that are disposed outer most, the function of which will be described more fully herein below.

It will be seen that the force feed device 10 includes a frame 39 which is adjustably mounted upon the longitudinal support elements 35, as best seen in FIG. 3. In the embodiment shown, the frame 39 includes a pair of substantially vertical plates 40 which are disposed in substantially parallel relation and which are rigidly interconnected together by transverse frame elements 41, the latter being rigidly interconnected by longitudinal frame elements 42. Each of the vertical plates 40 has a substantially flat horizontally disposed slide plate 43 integrally formed with the lower edge thereof and projecting laterally outwardly therefrom. Each slide plate 43 has a vertical flange 44 integrally formed with the outer edge thereof and projecting downwardly therefrom. It will be seen that the slide plates 43 are positioned upon the upper surface of the longitudinal support elements 35 and that the vertical flanges thereof engage the outer vertical surfaces of the longitudinal support elements.

The vertical flange 44 of each of the slide plates 43 is provided with a plurality of apertures 45 therethrough as best seen in FIG. 3. It will also be seen that a plurality of similar vertically disposed longitudinally spaced apart brackets 45 are secured in each of the slide plates 43 adjacent the outer marginal edge thereof and each of which is positioned closely adjacent one of the apertures 45 in the associated flange 44. Each bracket 46 is also provided with an aperture 47 therethrough which is disposed in substantially vertical alignment with the associated aperture 45 in the flange 44. Each of the slide plates 43 is also provided with an elongate bracket 48 which is affixed thereto and which projects upwardly therefrom in substantially parallel relation with respect to the associated vertical plate 40. It will be noted that the bracket 48 for each slide plate 43 is positioned adjacent the rear end portion of the latter and is disposed centrally of the slide plate. It will further be noted that each bracket 38 is provided with a plurality of longitudinally spaced apart apertures 49 therein the function of which will become more apparent herein below.

It will be seen that each of the vertical plates 40 is provided with a substantially flat horizontally disposed guide plate 50 which is integrally formed therewith and which projects outwardly therefrom. It will be noted that each of the guide plates 50 is spaced above the associated slide plate 43 and is located adjacent the forward end of the vertical plate 40. Slidably mounted upon the guide plate 50 are a pair of bearing plates 51 each being vertically disposed and each having a pair of inturned vertically spaced apart flanges 52 which are disposed against the respective upper and lower surfaces of the guide plate 50 and which define a slide. An elongate revolvable drive roller 53 of substantially cylindrical cross sectional configuration and formed of a suitable yieldable resilient material such as rubber or the like is provided with an elongate axle 54 therethrough which is journalled in the bearing plates 51. A reversible rotary hydraulic motor 55 is mounted on one of the bearing plates 51 and the output shaft thereof is interconnected with the axle 54 for driving the drive roller 53. It will be seen since the axle 54 interconnects the respective bearing plates 51, the roller 53 may be shifted relative to the frame 39 in a fore and aft direction. It is pointed out that the roller 53 is adapted to engage the end flanges 32 of the cable reel 31 to revolve the cable reel during the cable laying operation.

Means are provided for adjustably shifting the roller 53 in a fore and aft direction with respect to the frame 39. This means includes a pair of L-shaped actuator levers 56 each being pivotally connected at the front end of one of its arms 56a to one of the bearing plates 51 by means of a pivot 57. Each of the L-shaped actuator levers is provided with an attachment element 58 integrally formed therewith which is pivotally connected by means of a pivot 59 to one end of an elongate plunger or thrust member 60. The other end of the plunger projects into a cylinder 61 and is extensible and retractable relative thereto.

The cylinder 61 is provided with an apertured attachment ear 62 and a pin 63 pivotally connects the attachment ear 62 to a selected one of the apertures 49 in the bracket 48. The cylinder 61 has a helical spring 64 positioned therein, one end of which bears against the collar or piston carried by the plunger 60 and the other end of which bears against a compression plate 65 secured to a threaded element 66 and projects exteriorly of the cylinder 61. Adjustment of the threaded member 66 which is slotted at its exterior end causes shifting movement of the compression plate 65 axially of the cylinder 61 so that the tension on the helical spring may be varied. A suitable lock nut threadedly engages the threaded element 66 to retain the same in an adjusted position. Therefore, the component of force transmitted through the plunger 60 and actuator member 56 to the associated bearing plate 51 may be readily varied.

It will therefore be seen that the drive roller 53 is axially adjustably mounted relative to the frame 39 and may be yieldably urged against the end flanges of the cable reel 31 by grasping the actuating handle 56b of the actuator member 56 and moving the same in a clockwise direction as viewed in FIG. 1 to cause the plunger 60 and actuating members to be moved downwardly beyond an over center position. This will urge the roller 53 rearwardly against the end flanges of the cable reel 31, and the driving roller will be yieldably urged into engaging relation with these end flanges for driving the reel.

Means are provided for operating the rotary hydraulic motor 55 to drive roller 53 and cable reel 31 only when the cable being laid is subjected to tension during the cable laying operation. This control means is also operable to render the motor 55 ineffective when there is no tension exerted on the cable as it is unwound from the reel 31. This means includes a tension sensing mechanism 67 which is comprised of an elongate generally channel-shaped guide member 68 positioned below the frame 39. This channel-shaped guide member 68 has a U-shaped attachment bracket 69 rigidly secured thereto intermediate the ends thereof and a pivot rod 70 is fixedly connected to the bracket 69 and projects upwardly therefrom. One of the transverse elements 41 of the frame 39 has a vertical support element 71 rigidly affixed thereto intermediate the ends thereof and depending downwardly therefrom. The other of the transverse frame elements 41 is a diagonal support element 72 integrally formed therewith and projecting downwardly and forwardly therefrom to be connected to the vertical frame element 71. The pivot rod 70 projects through an aperture formed in the lower end of the support element 72 so that the pivot rod 70 is suspended from the frame 39 for pivoting movement relative thereto about a vertical axis defined by the pivot rod 70. It is pointed out that a suitable sleeve type bearing 73 is provided for the pivot rods 70 and is interposed between the lower end of the diagonal support members 72 and a retaining element 74 secured to the rod 70 to properly maintain the guide member 68 in predetermined horizontal spaced relation from the frame 39.

An elongate slide rod 75 is positioned within the guide member 68 and projects rearwardly therefrom as best seen in FIGS. 3, 4 and 5. The rear end of the slide rod 75 has a generally U-shaped pulley supporting member 76 integrally formed therewith and a conventional groove type pulley 77 is positioned within the concavity defined by the U-shaped pulley member 76. Pulley 77 is journalled for rotation relative to the U-shaped support member 76 by axle 78 which projects through suitable openings in the member 76.

During the cable winding operation, it will be noted that the cable C is trained about the pulley 77 which is located above and slightly forwardly of the guide rollers 28 and 29 associated with the trench forming element 76. Thus a loop is formed in the cable the cause of the disposition of the pulley 77 with respect to the cable reel and guide rollers associated with the trench forming implement. Tension exerted by the cable during the cable laying operation causes the pulley and slide rod 75 associated therewith to be moved longitudinally with respect to the guide 68.

Means are provided for operating the hydraulic rotary motor 55 to revolve the drive roller 53 when tension is exerted on the pulley 77 by the cable C during the cable laying operation. This means includes a proportional control valve mechanism 79 which is fixedly mounted on the guide 68 at one side intermediate the ends thereof. The proportional valve mechanism 79 includes a valve housing 80 having a suitable valve element therein which is shiftable between a closed position to a completely opened position. It is pointed out that the control valve mechanism 79 is interposed in controlling relation with respect to the hydraulic fluid supplied to the motor 55 whereby the motor 55 will be rendered ineffective if the valve element therein is in the closed position, and permitting the speed of the motor to be progressively increased as the valve element is moved from the closed position towards the open position.

Means are provided for shifting the valve element between closed and open positions and this means includes an operation lever 81 which is operatively connected to valve element (not shown) of the valve mechanism 79 and which is shown is located exteriorally of the valve housing 80. It is pointed out that when the operating lever 81 is disposed in the position illustrated in FIG. 4 of the drawing, the valve element will be in closed position and when the valve lever is moved in a clockwise direction as viewed in FIG. 4, the valve element will be progressively opened.

The operating lever 81 is moved relative to a quadrant or central plate 82 which is affixed to the exterior surface of the housing and which defines an arc of substantially 90 degrees. A pair of stop elements 83 are fixed to the respective ends of the quadrant plate 82 and are engaged by the operating lever 81 to limit movement of the same in valve closing and open directions.

The valve lever 81 is connected at its upper end to one end of a flexible link 84, the other end of the link being connected to one end of an arm 85 of a bell crank lever 86. The bell crank lever 86 is pivotally connected to a bracket 87 carried by the valve housing 80 by means of a pivot 88. The other arm 89 of the bell crank 86 is pivotally connected to an elongate rod 90 which projects rearwardly therefrom through an apertured bracket 91 secured to the U-shaped support member 76. The free end of the rod 90 has a retaining element or collar 92 secured thereto and a helical coil spring 93 is positioned around the end of the rod 90 and extends between and engages the bracket 91 and collar 92. It will therefore be seen when the pulley 77 is moved to the right or rearwardly as viewed in FIGS. 4 and 5, the operating lever 81 of valve 79 will be moved from the normal closed position towards the open position. The coil spring 93, however, tends to normally urge the actuating lever towards the closed position.

Referring again to FIG. 3, it will be seen that the hydraulic rotary motor 55 has a pair of conduits 94 and 95 connected by suitable fittings in communicating relation therewith. Interposed in flow controlling relation with respect to conduit 94 is a one way check valve 96 and a coupling T 97 is interposed in communicating relation in the conduit 95. A small branch conduit 98 interconnects the coupling T 97 with the one way check valve 96. The conduits 94 and 95 are respectively connected to a reversing valve mechanism 99, the latter being provided with a fitting 100 to which is connected a supply conduit 101 which in turn is connected to a source of hydraulic liquid under pressure.

A pair of conduits 102 and 100 each at one end thereof connected in communicating relation with a proportional control valve mechanism 79. The conduit 100 is connected to the reversing valve 99 in communicating relation therewith.

Referring again to FIG. 3 it will be seen that the hydraulic rotary motor 55 has a pair of conduits 94 and 95 connected by suitable fittings in communicating relation therewith. Interposed in flow controlling relation with respect to conduit 95 is a pressure responsive one way check valve 96 which is interconnected to a coupling T 97 by means of a branch conduit 98. A flow control valve mechanism 99 is also interconnected in flow controlling relation with respect to conduits 94 and 95 and this flow control valve mechanism is also interconnected by a conduit 100 with valve mechanism 79. A pump 101 is interconnected by conduit 102 to the valve mechanism 79 and by conduit 103 to a reservoir 103a. A conduit 103b interconnects the reservoir with the flow control valve mechanism 99. Although not shown in the drawing, the flow control valve mechanism 99 is provided with a lever which is shiftable from a neutral position to a forward position and a reverse position.

When the control lever for the valve mechanism 99 is in the neutral position, no hydraulic fluid is supplied to the hydraulic motor 55. When the valve mechanism 99 is in the forward or normal operating position, hydraulic fluid is supplied from the pump through the valve mechanism 79 and through the conduit 100 to the valve mechanism 99 and through the conduit 95 to operate the rotary motor 55 to unwind the cable reel. However, when the valve mechanism 79 is urged to its closed position, not only is the hydraulic fluid supply to the valve mechanism 99 diminished but there will be a drop in pressure through the conduit 98 which causes the valve mechanism 96 to close and immediately stop the motor 55. When the actuating lever for the valve mechanism 99 is in the reversed position, the motor 55 will be driven in a direction to wind up the cable.

Referring now to FIG. 7, it will be seen that means are provided for locking the frame 39 in an adjusted position relative to the support elements 35. This means includes a plurality of U-bolt members 104 which secure each side of the frame 39 to the associated support elements 35. It will be noted that one leg 105 of the U-bolt members 104 projects through the aperture 47 in one of the brackets 46 and that the other leg 106 of the U-bolt passes through the associated aperture 45 on the vertical flange 44 of each of the slide plates 43, and through the aperture in the support member 45. The locker leg 105 of each U-bolt is provided with a helical spring which tends to resist withdrawal of the shorter leg of the U-bolt through the aperture and flange 44 and the support member 45. It will therefore be seen that the frame 39 can be adjustably positioned and releasably fixed in place with respect to the support members 45.

In use, the frame 39 will be selectively positioned on the support member 35 and the drive roller 53 will be urged into engaging relation with the flanges of the cable reel 31. The control lever for the valve mechanism 99 will be urged to the forward position and the cable laying operation will begin. It will be seen that the spring 93 normally urges the valve lever 81 towards the closed position so that the rotary motor 55 will be rendered inoperative. However, during the cable laying operation and when the cable exerts a pull on a pulley mechanism to urge the pulley and its associated slide rod 75 in a rearward direction, the proportional valve lever 81 will be urged in a direction to progressively open the valve mechanism. Thus fluid will be supplied to the conduits 98 and 100 and through the valve mechanism 99 to revolve the motor 55 in a direction to unwind the cable. As the cable is unwound from the cable reel 31, the tension exerted on the pulley mechanism 67 will be diminished and the spring 93 will urge the valve lever 81 towards a closed position. As the pressure in the conduit 98 is diminished, the valve 96 will be closed and the motor 55 will be immediately stopped thereby preventing over travel. It will therefore be seen that the cable reel will only be driven to unwind the cable therefrom only when the pulley mechanism is subjected to tension. With the particular arrangement not only is the cable unwound from the cable reel with a positive drive, but the arrangement of the valve mechanism is such that the danger of over travel and too much slack forming in the cable is precluded.

When it is desirable to rewind the cable, the actuating lever for the valve mechanism 99 is simply urged to the reverse position. The drive roller 53 will be yieldably but possibly urged into driving relation with the end flanges of the cable reel and the entire tension sensing mechanism 67 can pivot about the vertical axis 70 to accommodate the cable as it is unwound in helical fashion from the cable reel.

From the foregoing it will be seen that I have provided a novel force feed mechanism which is adaptable for use with conventional cable laying operations and which is operable to very effectively facilitate laying of the cable even when traversing uneven terrain and the like.

It will, of course, be understood that various changes may be made in the form, details, arrangement and proportions of the various parts without departing from the scope of my invention.

What is claimed is:
1. In a mobile rotary cable laying apparatus of the type used in laying subsurface cable and including a chassis having ground engaging wheels for traversing the surface of the ground, a revolvable reel mounted on said chassis having end flanges and having a cable wound thereon, and a subsurface cable laying implement secured to said chassis and depending therefrom, a force feed device comprising
  a frame being adjustably mountable on said chassis in close proximity to the reel,
  a mounting structure shiftable on said frame between first and second positions,
  a revolvable drive member rotatably mounted on said mounting structure for rotation relative thereto and being shiftable with said mounting structure, said drive member being yieldably maintained in engaging relation with an end flange of the reel for revolving the latter when said mounting structure is in one of said positions,
  power means drivingly connected with said drive member for revolving the same,
  a pulley mechanism shiftably mounted on said frame and adapted to have the reel mounted cable trained thereover, said pulley mechanism being shiftable relative to said frame reel in response to tension exerted thereon by the cable when the cable is unwound from the reel during the cable laying operation,
  and a control mechanism operably connected with said power means in controlling relation therewith and being connected with said pulley mechanism, said control mechanism being operable in response to movement of said pulley mechanism to cause operation of the power means when tension is exerted on the pulley mechanism by the cable, and in the absence of tension exerted on the pulley mechanism being operable to render the power means ineffective.

2. In an apparatus as defined in claim 1 wherein said power means comprises a hydraulic motor and said control mechanism comprises a valve.

3. In a mobile rotary cable laying apparatus of the type used in laying subsurface cable and including a chassis having ground engaging wheels for traversing the surface of the ground, a revolvable reel mounted on said chassis and having end flanges and having a cable wound thereon, a subsurface cable laying implement mounted on said chassis, a force feed device comprising a frame being adjustably mounted on said chassis in close proximity to the reel, drive member mounting means yieldably mounted on said frame for shifting movement relative thereto between first and second position, a revolvable drive member rotatably mounted on said mounting means for rotation relative thereto and shifting movement therewith, said drive member engaging an end flange of the reel for revolving the latter, power means drivingly connected with said drive member for revolving the same, a pulley mechanism shiftably mounted on said frame and adapted to have the reel mounted cable trained thereon, said pulley mechanism being shiftable relative to said frame reel in response to tension exerted thereon by the cable when the cable is unwound from the reel during the cable laying operation, and a control mechanism operably connected with said power means in controlling relation therewith and being connected with said pulley mechanism, said control mechanism being operable in response to movement of said pulley mechanism to cause operation of the power means when tension is exerted on the pulley mechanism by the cable, and in the absence of tension exerted on the pulley mechanism by the cable, said control mechanism being operable to render the power means inoperable.

4. In an apparatus as defined in claim 3 wherein said pulley mechanism includes a pulley having an elongate arm secured thereto and being slidably relative to said frame in response to a variance of tension exerted thereon by the cable.

5. In an apparatus as defined in claim 3 wherein said drive member mounting means is mounted for sliding adjustment relative to said frame, and is normally urged into engaging relation with the end flange of the reel.

6. In an apparatus as defined in claim 3 wherein said power means comprises a rotary hydraulic motor connected to a source of hydraulic fluid under pressure, and said control mechanism comprises a hydraulic valve.

References Cited

UNITED STATES PATENTS

| 2,184,912 | 12/1939 | Freeman et al. | 61—726 |
| 2,630,277 | 3/1953 | Haller | 242—75.53 X |
| 2,741,437 | 4/1956 | Haworth | 242—45 |
| 3,202,376 | 8/1965 | Dutro et al. | 242—75.1 |
| 3,239,161 | 3/1966 | Dutro et al. | 242—75.1 |

EARL J. WITMER, *Primary Examiner*.